United States Patent [19]

Wanka et al.

[11] 4,396,671

[45] Aug. 2, 1983

[54] WHITE PHOTOGRAPHIC PAPER SUPPORT AND METHOD OF PRODUCING SAME

[75] Inventors: Rudolph Wanka; Heinz Wilke, both of Osnabruck; Wolfram Wysk, Belm; Uwe Jensen, Osnabruck, all of Fed. Rep. of Germany

[73] Assignee: Felix Schoeller, Jr., GmbH & Co., K.G., Osnabruck, Fed. Rep. of Germany

[21] Appl. No.: 277,113

[22] Filed: Jun. 25, 1981

[30] Foreign Application Priority Data

Nov. 21, 1980 [DE] Fed. Rep. of Germany ....... 3043864

[51] Int. Cl.[3] ........................ B32B 5/16; B32B 27/10; G03C 1/86

[52] U.S. Cl. .................................... 428/323; 428/328; 428/330; 428/511; 428/513; 428/537; 430/504; 430/531; 430/536

[58] Field of Search ............... 428/330, 323, 328, 511, 428/513, 537, 411; 430/536, 531, 504

[56] References Cited

U.S. PATENT DOCUMENTS

| | | | |
|---|---|---|---|
| 3,833,380 | 9/1974 | Crawford et al. | 430/504 |
| 4,010,307 | 3/1977 | Canard et al. | 428/330 X |
| 4,113,908 | 9/1978 | Shinomura | 428/330 X |
| 4,145,480 | 3/1979 | Kusama et al. | 428/513 |
| 4,265,960 | 5/1981 | Arbit et al. | 428/330 X |
| 4,269,891 | 5/1981 | Minagawa | 428/330 X |

FOREIGN PATENT DOCUMENTS

| | | |
|---|---|---|
| 1447611 | 3/1969 | Fed. Rep. of Germany . |
| 1422865 | 2/1970 | Fed. Rep. of Germany . |
| 2326759 | 12/1974 | Fed. Rep. of Germany . |
| 2529989 | 1/1976 | Fed. Rep. of Germany . |
| 1447815 | 2/1976 | Fed. Rep. of Germany . |
| 2654220 | 6/1978 | Fed. Rep. of Germany . |

*Primary Examiner*—Thomas J. Herbert, Jr.
*Attorney, Agent, or Firm*—Lockwood, Dewey, Alex & Cummings

[57] ABSTRACT

A photographic support material includes a base paper upon which a polyolefin coating is coated on at least one side. The coating includes titanium dioxide therein and at least one alkaline earth metal oxide in an amount of about 0.05-20% by weight of the coating, preferably calcium and/or magnesium oxide, and/or an alkaline earth metal carbonate in an amount of about 0.05-10% by weight of the coating, preferably calcium and/or magnesium carbonate.

17 Claims, 3 Drawing Figures

WHITE PHOTOGRAPHIC PAPER SUPPORT AND METHOD OF PRODUCING SAME

This invention relates to a photographic paper support, especially a waterproof-coated paper support for photographic purposes, the upper face coating of which contains a white pigment.

Waterproof photographic papers consist of a paper support with synthetic resin films applied onto both faces and of a photosensitive coating consisting of one or more layers based upon silver salts on one of the synthetic resin surfaces. The photosensitive layers may involve either black and white or color photographic layers.

The synthetic resin films situated on the base paper may consist according to DAS No. 1,447,815 of polyolefin, e.g. polyethylene, and be coated onto the paper by extrusion coating. They may, however, also be formed of organically dissolved lacquer mixtures, as described for example in DP No. 912,173.

The synthetic resin film front face coating disposed beneath the photosensitive layer or layers usually contains light-reflecting white pigment and possibly also graduating shading dyes, optical brighteners and/or other additives such as lubricants and antistatically active compounds.

The synthetic resin film rear face coating disposed upon the side of the paper opposite to the photosensitive layers may be pigmented or pigment-free and/or contain other additives, which will depend upon the particular use of the laminate as a photographic support. This layer can, moreover, be coated with further functional layers, e.g. coatings enabling it to be written upon, antistatic coatings, lubricating coatings, coatings impermeable to light, etc.

A most important constituent in the front face coating situated between the base paper and photosensitive coatings is, apart from the water-repellent synthetic resin binder, the light-reflecting white pigment. This white pigment is determining not only for the visual impression of a photographic image, but also for the imaging quality and the durability of the photographic image produced in the adjoining photographic layers. A number of publications and inventions, therefore, concern themselves with the pigmenting of this water-repellent front face coating of the paper support. In particular the pigmenting of a front face coating based upon polyolefin and applied by extrusion coating, is the subject of a number of investigations.

U.S. Pat. No. 3,833,380 claims, as white pigment in a polyethylene coating, a rutile titanium dioxide, because the already known ultraviolet light absorption capability of rutile proved advantageous for the durability of color photographic images.

DOS No. 2,529,989 proposes the use of a special anatase titanium dioxide, surface-treated with aluminium hydroxide, because the bleaching is higher than with the widespread rutile titanium dioxide according to U.S. Pat. No. 3,833,380. And, in U.S. Pat. No. 4,145,480, the combined use of rutile titanium dioxide with anatase titanium dioxide is proposed, because such a mixture advantageously combines the density, fastness to light and image definition proper to rutile with the higher whiteness and better compatability with the optical brightener proper to anatase.

The use of further white pigments in polyolefin coating materials has, indeed, been described in various publications. All these proposals, however, have failed to find practical use on account of serious disadvantages.

A prejudice has even developed against some pigments because the described pigment coating mixtures cannot be after processed to a functionally suitable product. DOS No. 2,654,220 proposes, for example, the use of 5–40% calcium carbonate as white pigment, which leads to a reduction in production cost, is said to improve the surface characteristics on account of its small particle diameter of less than 0.4 μm, and is said to render unnecessary a special surface treatment for promoting the bond of photographic coatings. Actually, however, photographic paper supports which according to DOS No. 2,654,220 contain calcium carbonate in the stated quantities, are unsuitable because during the usual treatment of photographs produced therewith, carbon dioxide is released in the sometimes acid photographic baths. The fine bubbles consequently produced underneath the photographic coatings lead to premature damage to the photographic coatings. Moreover, the image definition of the photographic images produced with such papers clearly becomes worse.

It is furthermore known to shade the pigmented synthetic resin coating by addition of color pigments. By the use of such additives, not only is it possible to compensate a yellowish appearance of the coating, such as for example is desirable where $TiO_2$-rutile is used, but also the white impression of the surface can be adapted to the particular taste. Finally, additions of small quantities of colored pigments can also serve for compensating specific color errors of photographic coatings.

Also, the addition of so-called optical brighteners, such as 2.5-di (5-tert.butyl-benzoxazolyl-2') thiophene to the pigmented image carrier coating has long been known. The optical brightening, like the color graduation, is determined essentially by the relevant characteristics of the photographic coatings and the prevailing public taste.

The pigmented and possibly graduated and/or brightened white front face coating applied by extrusion coating is, after it has been solidified, usually surface-treated in order to achieve the result that photographic coatings disposed thereon shall bond well in spite of the water-repellent character of the synthetic resin. Such processes which serve for improving the bond have often been described. The corona treatment of the water-repellent surface described in DOS No. 1,447,611 is preferably used. But any other oxidizing surface treatment, and also special bond-promoting, thin intermediate coatings, e.g. according to DOS No. 1,447,611, are also suitable for assuring a reliable coatings with photographic coating mixtures and a reliable anchoring of the photosensitive layers to the surface.

A disadvantage in the pigmented front face coatings constituted according to the state of the art is that all the described white pigments, with the exception of the calcium carbonate used in DOS No. 2,654,220, promote the decomposition of the polyolefinic synthetic resin binder. During an extrusion coating by means of fishtail dies, decomposition products lead to pronounced corrosion phenomena at the nozzle lips after only a few days or at most two weeks. It is, therefore, necessary to regrind these lips at short intervals, since otherwise the profile of the coating applied from the melt becomes uneven and in the extreme case a contamination of the surface commences.

Another consequence of the unfavorable influence of the white pigments used is that the destruction of the binder, e.g. polyethylene, proceeds even after processing to photographic images. It has, indeed, been proposed, in order to prevent this destruction of the image carrier coating which occurs predominantly under the effect of light, to admix stabilizers and/or antioxygens into the coating mix or base paper. The effect of such additives is, however, still not satisfactory.

One particularly serious disadvantage of the known state of the art becomes apparent when, together with the white pigment, small quantitites of color pigments or optical brighteners are processed. It is then possible to recognize in the extruded film that, in particular where a titanium dioxide is used as white pigment, hitherto inexplicable inhomogeneities in the pigment distribution occur, which are visible in the direction of the grain as strips of different color intensity and thickness. It is conceivable that, due to a surface reaction of the pigment with the binder, irreversible agglomerations have been produced, but it is also possible that reactive threads have developed from the polymer decomposition initiated for example by the $TiO_2$, and leading to so-called "gel particles". The decisive feature is that in the coated material an undesired longitudinal stripe effect is visible which is caused by an uneven pigment distribution, and which so far cannot be reliably eliminated.

The disadvantages described here occur basically in all the white pigments described in the literature ($TiO_2$, $Sb_2O$, $ZrO_2$, $TiP_2O_7$) with the exception of calcium carbonate. Calcium carbonate, however, is not suitable as a pigment in photographic supports on the one hand due to the risk of $CO_2$ development in acid baths, and on the other hand due to its low refractive index. A consequence of the low refractive index is the clearly inferior image definition as compared with supports that contain $TiO_2$.

The task underlying the present invention, therefore, is to create a water-proof, white photographic paper support, which possesses the density and whiteness of a material coated with titanium dioxide in polyolefin, but overcomes the disadvantages of this mixed system. In particular, it is the task of the present invention to propose a method of coating, by which corrosion at the nozzle lips of the fishtail die shall be completely avoided and, even when various additives of shading pigments are used, a stripe-free, homogeneous coating with polyolefin mixtures containing titanium dioxide is rendered possible.

This task is achieved in that, for the coating of the base papers, such mixtures of polyolefin, titanium dioxide and possibly other additives are used which in addition contain an oxide and/or a carbonate of an alkaline earth metal.

With advantage, an addition of 0.05 to 10% by weight of a carbonate and/or 0.05 to 20% by weight of an oxide of an alkaline earth metal are employed.

The additional content of oxides and/or carbonates of the alkaline earth metals can, if desired, also lie above 20% by weight, e.g. at 25 or even 30% by weight. Surprisingly, the incorporation of such quantities additionally, for example, to 15–20% rutile and/or anatase presents no problems.

The preferred field of use is 0.1 to 5% by weight of a carbonate and/or 0.2 to 10% by weight of an oxide. Oxides and carbonates of calcium or magnesium are preferred, but also the corresponding compounds of strontium and barium are suitable as additives according to this invention to polyolefin coating materials containing titanium dioxide for the extrusion coating of photographic papers.

The paper substrate to be coated with a pigmented and stabilized polyolefin mixture according to this invention may be any photographic base paper, which has either been neutrally sized using alkyl ketene dimer or has a known acid sizing on a basis of precipitated resin soaps, fatty acid soaps or fatty acid anhydrides. Preferably, the base papers also carry a sealing and/or bond-promoting surface sizing or water-soluble or water-dispersible substances. The surface coating may contain antistatically active substances according to DAS No. 1,422,865 or DOS No. 2,326,759, and possibly also pigments and/or water-repellent additives and/or coloring additives. The base paper may be produced exclusively of cellulose fibers or from mixtures of cellulose fibers with synthetic fibers. It may have a weight per unit area of 60–300 $g/m^2$ and, more preferably, 70–200 $g/m^2$.

The pigment containing polyolefin coating material can be applied onto one or both sides of the paper. It consists essentially of a polyolefin (80–95% by weight), a titanium dioxide (20–5% by weight) and of an addition according to the present invention of 0.05–20% by weight of an alkaline earth carbonate or oxide. It can, if applicable, contain optical brighteners and/or shading or graduating dyes and/or antioxygenes and/or lubricants and is applied by extrusion coating at usual temperatures of 280° to 330° C.

The polyolefin is preferably polyethylene. Either polyethylene of high density or polyethylene of low density may be used. The polyolefin resin may, however, be an ethylene copolymer or polypropylene.

BRIEF DESCRIPTION OF THE DRAWING

For further explanation, examples are shown in the attached drawing in FIGS. 1 to 3 of white photographic paper supports with the invention in various embodiments.

Reference 1 denotes the base paper; reference 2 the coating consisting of a polyolefin according to this invention, which is constructed according to Examples 1 to 12 to follow. Reference 3 is, as an example, a bond-promoting coating, optionally with additives, such as a brightener. Reference 4 denotes the photosensitive coating or coatings. Reference 5 denotes the rear-face coating, also of a polyolefin, which may be transparent or pigmented, for example with carbon black. Reference 6 is a rear-face coating for making the photographic paper capable of being written upon and/or antistatic. In FIG. 3, between the polyolefin layer 2, and the base paper 1, a precoating 7 is further provided, which is applied directly onto the paper in order to impart to the paper additional gloss or to serve as a bond-promoting agent. Reference 8 is a rear-face coating which serves here as an anti-curl coating, that is to prevent curvature of the paper.

Figure 1:
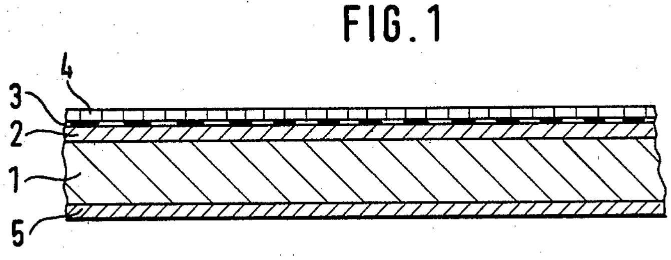
FIG. 1 depicts a photographic paper support incorporating the principles of the present invention and which is coated on both sides and has a photosensitive coating thereon.
Figure 2:
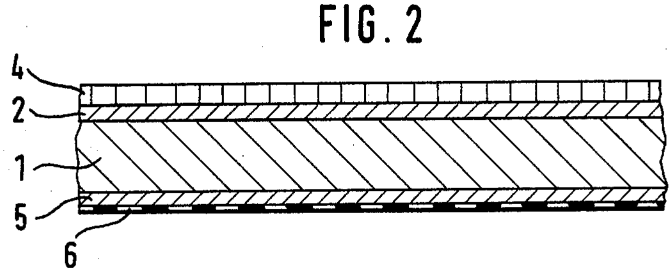
FIG. 2 also depicts a photographic paper support incorporating the principles of the present invention which is coated on both sides and has a photosensitive coating thereon, and which also is coated on its rear face with a coating which may be written upon and/or is antistatic.
Figure 3:
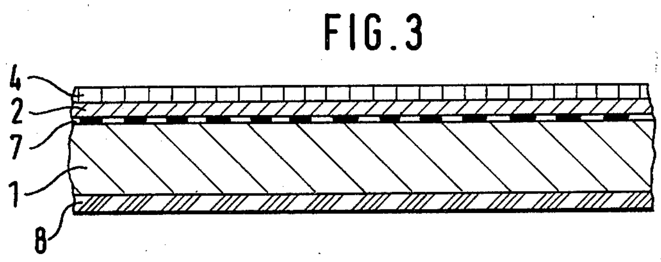
FIG. 3 depicts a photographic paper support incorporating the principles of the present invention and which has a photosensitive coating thereon and is also coated with an anti-curl coating on its rear face.

The invention is described in more detail by means of the following examples:

EXAMPLES 1-4

A photographic base paper of approximately 160 g/m$^2$ weight per unit area, sized by means of alkyl ketene dimer, and having a surface sizing of starch and sodium sulfate (according to GB No. 1,346,960) was coated on the front face by extrusion coating according to the summary shown in Table 1 with various mixtures on a polyethylene basis. The weight of coating in all cases was approximately 38 g/m$^2$. For all the papers, the opposite face was coated with approximately 38 g/m$^2$ of a mixture of:

80% by weight low-pressure polyethylene (density 0.96, fusion index 10), and

20% by weight high-pressure polyethylene (density 0.92, fusion index 4).

TABLE 1

Composition of the pigmented coating mixtures of Examples 1 to 4

| EXAMPLE | 1 (% by wt.) | 2 (% by wt.) | 3 (% by wt.) | 4 (% by wt.) |
|---|---|---|---|---|
| Polyethylene | 90 | 85 | 90 | 85 |
| $TiO_2$ (rutile) | 10 | 15 | 10 | 15 |
| Cobalt Blue | 0.18 | 0.1 | 0.16 | 0.25 |
| Cobalt Violet | 0.5 | — | — | 0.1 |
| Cadmium Red | — | 0.0012 | 0.024 | 0.0026 |
| Opt. Brightener | — | — | — | 0.1 |
| $CaCO_3$ | 1.5 | 0.3 | 0.35 | 0.5 |

EXAMPLE 5

An approximately 130 g/m$^2$ photographic base paper was coated on the front face by extrusion coating with approximately 30 g/m$^2$ of a pigmented synthetic resin mixture. The composition of the mixture was:

89% by weight polyethylene (density 0.935, fusion index 8),

10% by weight $TiO_2$-anatase, 0.4% by weight cobalt violet, (Co, Li-phosphate)

0.1% by weight ultramarine blue, and 0.5% by weight calcium carbonate.

The rear face was coated with approximately 30 g/m$^2$ of the same polyethylene mixture as in Examples 1 to 4.

EXAMPLE 6

An approximately 130 g/m$^2$ photographic base paper was coated on the front face with approximately 30 g/m$^2$ of a pigmented synthetic resin mixture. The composition of the mixture was:

89% by weight polyethylene (density 0.935, fusion index 8),

10% by weight $TiO_2$-rutile, 0.3% by weight cobalt violet, 0.2% by weight cobalt blue (Co-aluminate), and 0.5% by weight magnesium carbonate.

The rear face was coated as in Example 5.

EXAMPLE 7

An approximately 130 g/m$^2$ photographic base paper was coated on both sides as in Example 6, but with the difference that the front face coating contained 0.5% by weight strontium carbonate instead of magnesium carbonate.

EXAMPLE 8

An approximately 130 g/m$^2$ photographic base paper was coated on both faces as in Example 6, but with the difference that the front face coating contained 0.5% by weight calcium oxide instead of magnesium carbonate.

EXAMPLE 9

An approximately 170 g/m$^2$ photographic base paper was coated on the front face by extrusion coating with approximately 40 g/m$^2$ of a pigmented synthetic resin mixture. The composition of the mixture was:

11.9% by weight high-pressure polyethylene (density 0.917, fusion index 7),

50% by weight low-pressure polyethylene (density 0.96, fusion index 12),

12% by weight $TiO_2$-rutile,

15% by weight calcium oxide, and 0.1% by weight ultramarine blue.

The rear face was coated with approximately 40 g/m$^2$ of the same polyethylene mixture as applied in EXAMPLES 1-4.

EXAMPLE 10

An approximately 170 g/m$^2$ photographic base paper was coated on both faces as in Example 9, but with the difference that the coating on the front face contained 15% by weight magnesium oxide instead of calcium oxide.

EXAMPLE 11

An approximately 100 g/m$^2$ photographic base paper was coated on the front face by extrusion coating with approximately 20 g/m$^2$ of a synthetic resin mixture. The composition of the mixture was:

70% by weight polyethylene (density 0.935, fusion index 8), 11.8% by weight polystyrene resin ($\overline{M}$=60,000), 13% by weight titanium dioxide, 5% by weight calcium oxide, 0.1% by weight ultramarine blue, and 0.1% by weight tetrakis-(2,4-di-tert.butyl phenyl)-4,4'-biphenylene diphosphonite.

The rear face was coated with approximately 20 g/m$^2$ of the same polyethylene mixture as in Examples 1-4.

EXAMPLE 12

An approximately 70 g/m$^2$ photographic base paper was coated on the front face by extrusion coating with approximately 15 g/m$^2$ of a synthetic resin mixture. The composition of the mixture was:

83.83% by weight polyethylene (density 0.923, fusion index 4),

15% by weight, $TiO_2$-anatase,

1% by weight calcium oxide, 0.07% by weight ultramarine blue, and 0.17% by weight optical brightener 2,5-di (5-tert.butyl-benzoxazolyl-2') thiophene.

The rear face was coated with approximately 15 g/m$^2$ of the same polyethylene mixture as in Examples 1-4.

REFERENCE EXAMPLES

As comparisons to the synthetic resin-coated photographic paper supports described in Examples 1 to 12, corresponding coated paper supports were prepared as Examples 13 to 24, which differ from the examples according to this invention only in that the front-face pigmented coating mixture was free from the alkaline earth oxide or alkaline earth carbonate contained in the Examples 1 to 12.

Finally, as Example 25, a coated paper according to Example 1 of DOS No. 2,654,220 was produced. This example also serves as a reference example.

Testing of the Coated Support Materials (Examples 1–25)

The coated support materials were compared with one another in respect of their different running performance in extrusion coating and the homogeneity of dyeing of the front face coating and also coated after usual corona treatment of the surface with a photosensitive silver halide coating and processed to photographic images. The photographic images were compared with one another in respect of definition.

The important results of the tests are summarized in Table 2. From this the superior quality of the coated photographic support papers produced according to this invention by using mixtures of titanium dioxide with alkaline earth oxides or alkaline earth carbonates in clearly apparent.

TABLE 2

Comparative Testing of Examples 1–12 According to This Invention and Reference Examples 13–25:

| Example No. | Corrosion at Nozzle Lips | Appearance of Film in Transmitted Light | Behaviour in Baths | Image Definition$^x$ |
|---|---|---|---|---|
| 1 | Not after 1 Month | Homogeneous | Good | Relatively Good |
| 2 | Not after 1 Month | " | " | Relatively Good |
| 3 | Not after 1 Month | " | " | Relatively Good |
| 4 | Not after 1 Month | " | " | Relatively Good |
| 5 | Not after 1 Month | " | " | Relatively Good |
| 6 | Not after 1 Month | " | " | Relatively Good |
| 7 | Not after 1 Month | " | " | Relatively Good |
| 8 | Not after 1 Month | " | " | Relatively Good |
| 9 | Not after 1 Month | " | " | Relatively Good |
| 10 | Not after 1 Month | " | " | Relatively Good |
| 11 | Not after 1 Month | " | " | Relatively Good |
| 12 | Not after 1 Month | " | " | Relatively Good |
| 13 | After 2 days | Streaky | " | Relatively Good |
| 14 | After 3 days | " | " | Relatively Good |
| 15 | After 3 days | " | " | Relatively Good |
| 16 | After 2 days | " | " | Relatively Good |
| 17 | After 4 days | " | " | Relatively Good |
| 18 | After 2 days | " | " | Relatively Good |
| 19 | After 2 days | " | " | Relatively Good |
| 20 | After 2 days | " | " | Relatively Good |
| 21 | After 7 days | Slightly Streaky | " | Relatively Good |
| 22 | After 7 days | " | " | Relatively Good |
| 23 | After 7 days | " | " | Relatively Good |
| 24 | After 6 days | " | " | Relatively Good |
| 25 | Not after 1 month | " | $CO_2$ evolution | Clearly worse than 1–24 |

$^x$On account of the different pigment contents and application weights, these tests are to some extent not comparable with one another, but possess relative relationships to the particular classes.

What is claimed is:

1. Photographic support material comprising:
a base paper;
at least one polyolefin coating on at least one side of said paper; said coating including titanium dioxide therein and at least one material selected from the group consisting of an alkaline earth metal oxide and mixtures thereof in an amount of about 0.05 to 20% by weight of said coating.

2. The photographic support material of claim 1, wherein said alkaline earth metal oxide is calcium oxide.

3. The photographic support material of claim 1, wherein said alkaline earth oxide is magnesium oxide.

4. The photographic support material of claim 1, wherein said alkaline earth metal oxide is a mixture of at least two alkaline earth metal oxides.

5. The photographic support material of claim 1, wherein said polyolefin coating contains a mixture of an alkaline earth carbonate and an alkaline earth oxide.

6. The photographic support material of claim 1, wherein said coating is treated for the acceptance of a photographic coating thereon.

7. The photographic support material of claim 1, wherein said polyolefin coating also contains material from the group consisting of coloring pigments, optical brighteners and mixtures thereof.

8. The photographic support material of claim 1, wherein said polyolefin coating contains about 0.2 to 10% by weight of the coating of said alkaline earth metal oxide.

9. The photographic support material of claim 1, wherein both sides of said paper are coated with polyolefin.

10. The photographic support material of claim 9, wherein at least one of the coatings is treated for the acceptance of a photographic coating thereon.

11. The photographic support material of claim 1, wherein said polyolefin coating contains at least one material selected from the group consisting of calcium oxide and magnesium oxide, and mixtures thereof.

12. The photographic support material of claim 11, wherein both sides of said paper are coated with polyolefin.

13. The photographic support material of claim 11, wherein said coating is treated for the acceptance of a photographic coating thereon.

14. The photographic support material of claim 11, wherein said polyolefin coating contains about 0.2 to 10% by weight of the coating of said alkaline earth metal oxide.

15. A method of making a photographic material comprising coating base paper with a polyolefin coating by extruding said coating through a fishtail die, said polyolefin coating including titanium dioxide therein and at least one material selected from the group consisting of an alkaline earth metal oxide and mixtures thereof in an amount of about 0.05 to 20% by weight of said coating.

16. The method of claim 15, wherein said polyolefin coating contains at least one material selected from the group consisting of calcium oxide and magnesium oxide, and mixtures thereof.

17. The method of claim 15, wherein said polyolefin coating contains about 0.2 to 10% by weight of the coating of said alkaline earth metal oxide.

* * * * *

UNITED STATES PATENT AND TRADEMARK OFFICE
CERTIFICATE OF CORRECTION

PATENT NO. : 4,396,671

DATED : August 2, 1983

INVENTOR(S) : Rudolph Wanka, Heinz Wilke, Wolfram Wysk and Uwe Jensen

It is certified that error appears in the above-identified patent and that said Letters Patent are hereby corrected as shown below:

Column 3, line 7 - delete "antioxygens" and insert --antioxygenes--.

Column 6, lines 57 and 58 - after the word "oxide," the recitation "0.07%...and" should be a separate paragraph.

Column 7, line 9 - underline the line "Testing of the Coated Support Materials (Examples 1-25)".

Column 7, line 23 - delete "in" and insert --is--.

Signed and Sealed this

*Eighth* Day of *November 1983*

[SEAL]

*Attest:*

GERALD J. MOSSINGHOFF

*Attesting Officer* *Commissioner of Patents and Trademarks*